United States Patent Office 3,392,200
Patented July 9, 1968

3,392,200
METHOD OF RECOVERING METHYL ETHYL KETONE
Theodor Vrbaski, Harvey, Ill., assignor to Sinclair Research, Inc., New York, N.Y., a corporation of Delaware
No Drawing. Filed Feb. 20, 1964, Ser. No. 346,127
6 Claims. (Cl. 260—593)

ABSTRACT OF THE DISCLOSURE

Recovering methyl ethyl ketone from an aqueous solution of oxidation products of butene-1 oxidized in the presence of a catalyst of palladium or copper chlorides by solvent extraction with an alkylated benzene.

---

The present invention is directed to a method of recovering methyl ethyl ketone from catalytic oxidation products containing the same and obtained from the Wacker process for the production of methyl ethyl ketone.

Briefly, the Wacker process for the production of methyl ethyl ketone comprises oxidizing butene-1 with free molecular oxygen in the presence of a catalyst selected from the group consisting of palladium and copper chlorides. The crude oxidation product mixture resulting from this oxidation is usually an aqueous mixture containing in addition to about 1 to 25% by weight methyl ethyl ketone, higher and lower boiling oxidation by-products and minor amounts of the catalyst, e.g. about 9 to 18 grams per liter. The Wacker process is more fully described in Chemical Engineering News, vol. 50, July 8, 1963. Most methods employed for the recovery and purification of methyl ethyl ketone from the crude catalytic reaction mixture obtained from the Wacker process are either complex and/or expensive. To obtain pure methyl ethyl ketone from this mixture the following method is usually employed:

The crude oxidation products are first subjected to steam stripping to remove volatile components. A methyl ethyl ketone-water mixture is then separated from the resulting product and subjected to a second distillation to remove lighter boiling components. The resulting distillate bottoms is hydrogenated which is followed with caustic scrubbing. The caustic scrubbed bottoms is then subjected to distillation and the resulting methyl ethyl ketone bottom product subjected to a final distillation.

It is an object of the present invention to provide a method of recovering and purifying methyl ethyl ketone from the aqueous mixture of oxidation produced by the Wacker process, which method is far simpler, less expensive and just as effective as recovery methods heretofore employed and considered necessary for the production of high purity methyl ethyl ketone. In accordance with the method of the present invention the aqueous solution of catalytic oxidation products from the Wacker process is subjected to solvent extraction with a liquid alkylated benzene of 7 to 10 carbon atoms as for instance, toluene, xylene, ethylbenzene, cumene, cymene, pseudocumene, etc. These solvents have been found to be selective for methyl ethyl ketone while dissolving no water nor forming any constant boiling azeotrope with methyl ethyl ketone. The solvents have the additional advantage of having boiling points different enough from methyl ethyl ketone to enable an easy separation of the two components. Moreover, it has also been found that the solvents of the invention extract vary little or none of the palladium or copper chloride catalyst contained in the crude oxidation product mixture.

The extraction itself can be conducted employing conventional techniques of the art, for instance, utilizing an alkylated benzene solvent to aqueous solution volume ratio of about 1:1 to 1:10, preferably about 1:2 to 1:10. The aqueous solution of crude oxidation products can be that originally produced by the oxidation. It is preferred, however, to use a methyl ethyl ketone-saturated aqueous solution. Such a saturated solution can be conveniently obtained by repeated oxidation of a dilute catalytic solution of oxidation products containing methyl ethyl ketone in the presence of the catalyst, preferably preceding each reoxidation with a catalyst rejuvenation. The extraction can be conducted at ambient temperatures and atmospheric pressure, although elevated temperatures and pressure can be applied if desired. Preferred temperatures are about 40 to 70° C. A single extraction is generally sufficient but multiple extractions can also be used if necessary or desired.

The solvent extraction step of the invention produces a methyl ethyl ketone-containing extract phase and a raffinate phase. The raffinate phase contains the oxidation catalyst and can be subjected to a catalyst rejuvenation step and recycled to the oxidation reaction. This same catalyst rejuvenation step, however, can be just as well applied before the solvent extraction of the present invention for the solvent extraction has not been found to affect the activity of the aqueous catalytic solution.

The methyl ethyl ketone-containing anhydrous extract resulting from the solvent extraction can then be treated in the following manner to obtain substantially pure methyl ethyl ketone. The anhydrous extract can be first subjected to a light end-distillation to remove by-products lower boiling than methyl ethyl ketone. Examples of these lower boiling by-products are n-butyraldehyde, propionaldehyde, acetone and acetaldehyde. Subsequently the resulting distillation bottoms can be treated with an alkaline aqueous solution, such as alkali or alkaline earth metal solutions at elevated temperature, e.g. under reflux, to convert any remaining aldehydes to higher boiling aldehydes. The preferred alkaline solutions are sodium and barium hydroxide. The resulting mixture is then subjected to fractional distillation and substantially pure methyl ethyl ketone obtained as distillate.

The bottoms remaining from the last distillation to obtain pure methyl ethyl ketone contains heavy by-products such as 3-chloro-2-butanone, converted aldehydes such as 2-ethyl hexenal, small amounts of acetoin formed from the 3-chloro-2-butanone by hydrolysis with the alkali present and small amounts of resin. If desired, these compounds can be easily recovered and purified by distillation since the boiling point of 3-chloro-2-butanone is 115 to 120° C., 2-ethyl-hexenal 175° C. and 3-hydroxy-2-butanone (acetoin) 148° C., all at atmospheric pressure.

The following examples are included to further illustrate the present invention.

EXAMPLE I 200 milliliters of Wacker process aqueous catalytic solution containing 3.2 weight percent (4.0% by vol.) of methyl ethyl ketone and 0.21 weight percent (0.25% by vol.) of n-butyraldehyde were shaken with 50 ml. toluene at room temperature and atmospheric pressure for 30 minutes. 53.0% of methyl ethyl ketone was extracted, and the concentration of methyl ethyl ketone in the toluene extract was 7.3 weight percent. The methyl ethyl ketone distribution coefficient $(x_1-x_2):(x_1-x_3)$ between the upper organic and the lower aqueous layer was 1.13. In the distribution coefficient expression $$(x_1-x_2):(x_1-x_3) \ x_1=\text{conc.}$$

of methyl ethyl ketone, $x_2=$conc. of solvent and $x_3=$conc. of water.

The toluene extract containing about 7.3 weight percent of methyl ethyl ketone, 0.5 weight percent of n-butyraldehyde beside few other by-products in very small quantities, was treated with alkali at the refluxing temperature of methyl ethyl ketone for about 2–3 hours. The aldehyde concentration dropped after this period to trace quantities. Fractionation of the product in a microfractionation column with 75 theoretical plates gave anhydrous 99.9% methyl ethyl ketone with a 95% recovery. Heavy by-products such as 3-chloro-2-butanone concentrated in the toluene-bottoms and could be recovered in good yield by further fractionation.

EXAMPLE II 100 milliliters of Wacker process aqueous catalytic solution containing 6.6 weight percent (8.0% by volume) of methyl ethyl ketone and 0.25 weight percent (0.30% by volume) of n-butyraldehyde beside small amounts of other by-products, were shaken with 25 milliters of ortho-xylene at room temperature and atmospheric pressure for 30 minutes.

56.4% of methyl ethyl ketone was extracted, and the concentration of the methyl ethyl ketone in the ortho-xylene extract was 14.0 weight percent. The methyl ethyl ketone distribution coefficient $(x_1-x_2):(x_1-x_3)$ between the upper and the lower aqueous layers was 1.29. The raffinate aqueous catalytic solution containing about 2.9 weight percent of methyl ethyl ketone can be recycled to the oxidation or catalyst rejuvenation step. The rest of the purification procedure of the ortho-xylene extract of methyl ethyl ketone was the same as outlined in Example I.

EXAMPLE III 100 milliliters of the same aqueous solution described in Example II were extracted with 25 milliliters of ortho-xylene by shaking at 65° C. and atmospheric pressure for 30 minutes.

68.9% of methyl ethyl ketone was extracted, and the concentration of the methyl ethyl ketone in ortho-xylene extract was 16.6 weight percent. The methyl ethyl ketone distribution coefficient $(x_1-x_2):(x_1-x_3)$ between the organic and aqueous layers was 2.22. The raffinate catalytic solution containing about 2.1 percent by weight of methyl ethyl ketone can be recycled to the oxidation or catalyst rejuvenation step. The rest of the purification procedure of the ortho-xylene extract of methyl ethyl ketone was the same as outlined in Example I.

EXAMPLE IV 164 milliliters of Wacker process aqueous catalystic solution saturated with 14.4 weight percent (17.4% by volume) methyl ethyl ketone and 0.58 weight percent (0.69% by volume) n-butyraldehyde and also containing minor quantities of other by-products, were shaken with 41 milliliters of ortho-xylene at room temperature and atmospheric pressure for 30 minutes.

58.4% of methyl ethyl ketone was extracted, and the concentration of the methyl ethyl ketone in ortho-xylene extract was 27.2 weight percent. The methyl ethyl ketone distribution coefficient $(x_1-x_2):(x_1-x_3)$ between the organic and aqueous layers was 1.41. The raffinate aqueous solution containing about 9.6 weight percent of methyl ethyl ketone can be recycled to the oxidation or catalyst rejuvenation step.

The xylene extract was then freed by light end distillation from by-products boiling lower than methyl ethyl ketone. Among these are n-butyraldehyde, propionaldehyde, acetone and acetaldehyde. The bottom product was treated with alkali at reflux temperature of methyl ethyl ketone for about 2–3 hours. The product contained about 0.3 weight percent of aldehydes calculated as n-butyraldehyde.

Fractionation of this mixture in a microfractionation column with 75 theoretical plates gave anhydrous 99.9% methyl ethyl ketone with a 95% recovery. Heavy by-products such as 3-chloro-2-butanone, 2-ethyl hexenal and small amounts of acetoin can be recovered in good yields by further fractionation of the xylene bottoms.

EXAMPLE V 164 milliliters of the same aqueous solution described in Example 4 were extracted with 41 milliliters or ortho-xylene by shaking at 65° C. and atmospheric pressure for 30 minutes.

72.1% of methyl ethyl ketone was extracted and the concentration of the methyl ethyl ketone in the ortho-xylene extract was 31.4 weight percent. The methyl ethyl ketone distribution coefficient $(x_1-x_2):(x_1-x_3)$ between the organic and aqeuous layers was 2.58. The raffinate aqueous solution containing about 6.4 weight percent of methyl ethyl ketone was recycled to the oxidation or catalyst rejuvenation step. The rest of the purification procedure of the xylene extract of methyl ethyl ketone was similar to that described in Example IV.

EXAMPLE VI 142 milliliters of aqueous catalytic solution saturated with 25.3 weight percent (29.6% by volume) methyl ethyl ketone was extracted with 50 milliliters of cumene by shaking the mixture at room temperature and atmospheric pressure for 30 minutes.

69% methyl ethyl ketone was extracted and the methyl ethyl ketone concentration in the extract was 35.1 weight percent. The methyl ethyl ketone distribution coefficient $(x_1-x_2):(x_1-x_3)$ between the organic and aqueous layers was 2.23. The extracted aqeuous solution contained about 10 weight percent methyl ethyl ketone. The recovery of methyl ethyl ketone from the cumene extract was done in a similar manner as described in Example I.

It is claimed:

1. A method of recovering substantially pure, methyl ethyl ketone from an aqueous solution of oxidation products containing same obtained from the oxidation of butene-1 in the presence of a catalyst selected from the group consisting of palladium and copper chlorides which consists essentially of solvent extracting said solution with an alkylated benzene of 7 to 10 carbon atoms, subjecting the extract to fractional distillation to remove lower boiling components, treating the resulting distillation bottoms with an aqueous alkaline solution at an elevated temperature to convert remaining aldehydes to materials boiling higher than methyl ethyl ketone and subjecting the resulting mixture to fractional distillation to obtain substantially pure methyl ethyl ketone as distillate.

2. The method of claim 1 wherein the aqueous solution is saturated with methyl ethyl ketone.

3. The method of claim 1 wherein the extraction is conducted at about 40 to 70° C. while employing a solvent to solution volume ratio of about 1:2 to 1:10.

4. The method of claim 1 wherein the alkylated benzene is xylene.

5. The method of claim 1 in which the alkylated benzene is xylene and the extraction is conducted at about 40 to 70° C. while employing a solvent to solution volume ratio of about 1:2 to 1:10.

6. The method of claim 5 in which the xylene is orthoxylene.

References Cited

FOREIGN PATENTS 145,238   5/1962   Russia.

DANIEL D. HORWITZ, *Primary Examiner.*